(12) United States Patent
Braho et al.

(10) Patent No.: US 9,984,685 B2
(45) Date of Patent: May 29, 2018

(54) CONCATENATED EXPECTED RESPONSES FOR SPEECH RECOGNITION USING EXPECTED RESPONSE BOUNDARIES TO DETERMINE CORRESPONDING HYPOTHESIS BOUNDARIES

(71) Applicant: Hand Held Products, Inc., Fort Mill, SC (US)

(72) Inventors: Keith Braho, Murrysville, PA (US); Jason M. Makay, Moroeville, PA (US)

(73) Assignee: Hand Held Products, Inc., Fort Mill, SC (US)

( * ) Notice: Subject to any disclaimer, the term of this patent is extended or adjusted under 35 U.S.C. 154(b) by 467 days.

(21) Appl. No.: 14/535,764

(22) Filed: Nov. 7, 2014

(65) Prior Publication Data
US 2016/0133253 A1    May 12, 2016

(51) Int. Cl.
*G10L 15/00*    (2013.01)
*G10L 15/18*    (2013.01)
(Continued)

(52) U.S. Cl.
CPC ............ *G10L 15/22* (2013.01); *G10L 15/065* (2013.01); *G06F 17/2725* (2013.01);
(Continued)

(58) Field of Classification Search
CPC ....... G10L 15/01; G10L 15/065; G10L 13/04; G10L 15/08; G06F 17/2725
(Continued)

(56) References Cited

U.S. PATENT DOCUMENTS

| 4,882,757 A | 11/1989 | Fisher et al. |
| 6,275,802 B1 * | 8/2001 | Aelten ................... G10L 15/08 704/242 |

(Continued)

FOREIGN PATENT DOCUMENTS

| EP | 1011094 A1 | 6/2000 |
| WO | 2007118029 A2 | 10/2007 |

(Continued)

OTHER PUBLICATIONS

U.S. Appl. No. 13/367,978, filed Feb. 7, 2012, (Feng et al.); now abandoned.

(Continued)

*Primary Examiner* — Farzad Kazeminezhad
(74) *Attorney, Agent, or Firm* — Additon, Higgins & Pendleton, P.A.

(57) ABSTRACT

A speech recognition system used for hands-free data entry receives and analyzes speech input to recognize and accept a user's response. Under certain conditions, a user's response might be expected. In these situations, the expected response may modify the behavior of the speech recognition system to improve performance. For example, if the hypothesis of a user's response matches the expected response then there is a high probability that the user's response was recognized correctly. This information may be used to make adjustments. An expected response may include expected response parts, each part containing expected words. By considering an expected response as the concatenation of expected response parts, each part may be considered independently for the purposes of adjusting an acceptance algorithm, adjusting a model, or recording an apparent error. In this way, the speech recognition system may make modifications based on a wide range of user responses.

30 Claims, 7 Drawing Sheets

(51) Int. Cl.
  *G10L 15/22* (2006.01)
  *G10L 15/065* (2013.01)
  *G10L 13/04* (2013.01)
  *G10L 15/01* (2013.01)
  *G06F 17/27* (2006.01)
  *G10L 15/08* (2006.01)

(52) U.S. Cl.
  CPC .............. *G10L 13/04* (2013.01); *G10L 15/01* (2013.01); *G10L 15/08* (2013.01); *G10L 2015/088* (2013.01)

(58) Field of Classification Search
  USPC .................................... 704/232, 251, 242, 2
  See application file for complete search history.

(56) References Cited

U.S. PATENT DOCUMENTS

| | | | |
|---|---|---|---|
| 6,832,725 B2 | 12/2004 | Gardiner et al. | |
| 7,128,266 B2 | 10/2006 | Marlton et al. | |
| 7,159,783 B2 | 1/2007 | Walczyk et al. | |
| 7,413,127 B2 | 8/2008 | Ehrhart et al. | |
| 7,580,838 B2 * | 8/2009 | Divay ................ G06F 17/2725 704/257 | |
| 7,726,575 B2 | 6/2010 | Wang et al. | |
| 7,827,032 B2 | 11/2010 | Braho et al. | |
| 7,865,362 B2 | 1/2011 | Braho et al. | |
| 7,895,039 B2 | 2/2011 | Braho et al. | |
| 7,949,533 B2 | 5/2011 | Braho et al. | |
| 8,200,495 B2 | 6/2012 | Braho et al. | |
| 8,255,219 B2 | 8/2012 | Braho et al. | |
| 8,294,969 B2 | 10/2012 | Plesko | |
| 8,317,105 B2 | 11/2012 | Kotlarsky et al. | |
| 8,322,622 B2 | 12/2012 | Suzhou et al. | |
| 8,366,005 B2 | 2/2013 | Kotlarsky et al. | |
| 8,371,507 B2 | 2/2013 | Haggerty et al. | |
| 8,374,870 B2 | 2/2013 | Braho et al. | |
| 8,376,233 B2 | 2/2013 | Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Van Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,612,235 B2 | 12/2013 | Braho et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,736,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |

(56) References Cited

U.S. PATENT DOCUMENTS

| | | |
|---|---|---|
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Bremer et al. |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 2005/0071158 A1 | 3/2005 | Byford |
| 2006/0178882 A1 | 8/2006 | Braho et al. |
| 2007/0063048 A1 | 3/2007 | Havens et al. |
| 2007/0192095 A1* | 8/2007 | Braho ............... G10L 15/01 704/232 |
| 2007/0192101 A1* | 8/2007 | Braho ............... G10L 15/065 704/251 |
| 2007/0198269 A1 | 8/2007 | Braho et al. |
| 2009/0134221 A1 | 5/2009 | Zhu et al. |
| 2009/0281785 A1* | 11/2009 | Ressler ............... G10L 13/04 704/2 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0029312 A1 | 2/2011 | Braho et al. |
| 2011/0029313 A1 | 2/2011 | Braho et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |

(56) References Cited

U.S. PATENT DOCUMENTS

| | | |
|---|---|---|
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |

FOREIGN PATENT DOCUMENTS

| | | |
|---|---|---|
| WO | 2007118030 A2 | 10/2007 |
| WO | 2007118032 A2 | 10/2007 |
| WO | 2013163789 A1 | 11/2013 |
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 14/462,801 for Mobile Computing Device With Data Cognition Software, filed Aug. 19, 2014 (Todeschini et al.); 38 pages.

U.S. Appl. No. 14/596,757 for System and Method for Detecting Barcode Printing Errors filed Jan. 14, 2015 (Ackley); 41 pages.

U.S. Appl. No. 14/277,337 for Multipurpose Optical Reader, filed May 14, 2014 (Jovanovski et al.); 59 pages.

U.S. Appl. No. 14/200,405 for Indicia Reader for Size-Limited Applications filed Mar. 7, 2014 (Feng et al.); 42 pages.

U.S. Appl. No. 14/662,922 for Multifunction Point of Sale System filed Mar. 19, 2015 (Van Horn et al.); 41 pages.

(56) References Cited

OTHER PUBLICATIONS

U.S. Appl. No. 14/446,391 for Multifunction Point of Sale Apparatus With Optical Signature Capture filed Jul. 30, 2014 (Good et al.); 37 pages.
U.S. Appl. No. 29/528,165 for In-Counter Barcode Scanner filed May 27, 2015 (Oberpriller et al.); 13 pages.
U.S. Appl. No. 29/528,890 for Mobile Computer Housing filed Jun. 2, 2015 (Fitch et al.); 61 pages.
U.S. Appl. No. 14/614,796 for Cargo Apportionment Techniques filed Feb. 5, 2015 (Morton et al.); 56 pages.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 14/578,627 for Safety System and Method filed Dec. 22, 2014 (Ackley et al.); 32 pages.
U.S. Appl. No. 14/573,022 for Dynamic Diagnostic Indicator Generation filed Dec. 17, 2014 (Goldsmith); 43 pages.
U.S. Appl. No. 14/529,857 for Barcode Reader With Security Features filed Oct. 31, 2014 (Todeschini et al.); 32 pages.
U.S. Appl. No. 14/519,195 for Handheld Dimensioning System With Feedback filed Oct. 21, 2014 (Laffargue et al.); 39 pages.
U.S. Appl. No. 14/519,211 for System and Method for Dimensioning filed Oct. 21, 2014 (Ackley et al.); 33 pages.
U.S. Appl. No. 14/519,233 for Handheld Dimensioner With Data-Quality Indication filed Oct. 21, 2014 (Laffargue et al.); 36 pages.
U.S. Appl. No. 14/533,319 for Barcode Scanning System Using Wearable Device With Embedded Camera filed Nov. 5, 2014 (Todeschini); 29 pages.
U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. No. 14/405,278 for Design Pattern for Secure Store filed Mar. 9, 2015 (Zhu et al.); 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
U.S. Appl. No. 14/519,179 for Dimensioning System With Multipath Interference Mitigation filed Oct. 21, 2014 (Thuries et al.); 30 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader , filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 14/715,916 for Evaluating Image Values filed May 19, 2015 (Ackley); 60 pages.
U.S. Appl. No. 14/513,808 for Identifying Inventory Items in a Storage Facility filed Oct. 14, 2014 (Singel et al.); 51 pages.
U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.
U.S. Appl. No. 14/483,056 for Variable Depth of Field Barcode Scanner filed Sep. 10, 2014 (McCloskey et al.); 29 pages.
U.S. Appl. No. 14/531,154 for Directing an Inspector Through an Inspection filed Nov. 3, 2014 (Miller et al.); 53 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices filed Apr. 1, 2015 (Yeakley et al.); 50 pages.
U.S. Appl. No. 14/257,364 for Docking System and Method Using Near Field Communication filed Apr. 21, 2014 (Showering); 31 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication Via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.

(56) References Cited

OTHER PUBLICATIONS

U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.
European Extended Search Report for related EP Application No. 15191528.7, dated Apr. 22, 2016, 9 pages (commonly owned references have been cited on separate SB-08).
R. A. Cole et al.; Experiments with a spoken dialogue system for taking the US census; Elsevier Science Publishers, Amsterdam, NL; vol. 23 No. 3 Speech Communication; dated Nov. 1, 1997, pp. 243-260 (cited in NPL1).
Zavaliagkos et al.: "Using Untranscribed Training Data to Improve Performance," ICSLP 98; 5th International Conference on Spoken Language Processing. (Incorporating 7th Australian International Speech Science and Technology Conference). Sydney Australia, Nov. 30-Dec. 4, 1998; International Conference on Spoken Language Proc, Oct. 1, 1998, p. p 1007 (4 pages total) (Cited in NPL1).
Yu Dong et al.; "Calibration of Confindence Measures in Speech Recognition", IEEE Transcations on Audio, Speech and Luguage Processing, IEEE Service Ceter, New York, NY; vol. 19, No. 8; dated Nov. 1, 2011 pp. 2461-2473 (Cited in NPL1).
European Extended Search Report for related EP Application No. 15192854, dated Apr. 22, 2016, 8 pages (commonly owned references have been cited on separate SB-08).

\* cited by examiner

CONCATENATED EXPECTED RESPONSES FOR SPEECH RECOGNITION USING EXPECTED RESPONSE BOUNDARIES TO DETERMINE CORRESPONDING HYPOTHESIS BOUNDARIES

FIELD OF THE INVENTION

The present invention relates to speech recognition and, more specifically, to speech recognition systems that use expected responses in order to improve performance.

BACKGROUND

Speech recognition systems used to facilitate hands-free data entry face the problems of incorrectly recognizing a word due to having an acoustic model that is not well matched to the input audio, and falsely rejecting a word because of poor confidence in its accuracy. These problems result in adverse consequences such as incorrect data entry, reduced user productivity, and user frustration.

The false-rejection problem has been addressed in a previous invention (i.e., U.S. Pat. No. 7,865,362), which is incorporated herein by reference in its entirety. In that invention, a speech recognition system's performance was improved by adjusting an acceptance threshold based on knowledge of a user's expected response at a point in a dialog. In that invention, a response was considered in its entirety. That is, when all of the words in the response hypothesis matched all of the words in the expected response, then the acceptance threshold for each hypothesis word could be adjusted. This approach, however, does not adequately address responses that contain multiple pieces of information (e.g., bin location and quantity picked) spoken without pausing. In these cases, discounting the entire response because of a mismatch in one part is too severe.

Therefore, a need exists for a speech recognition system that uses a more flexible expected response/hypothesis comparison to adjust its performance or adapt its library of models. The present invention embraces using parts of the hypothesis independently. This approach eliminates scenarios in which acceptable hypothesis parts are not considered for adaptation or rejected because of mismatches in other parts of the hypothesis.

SUMMARY

Accordingly, the present invention embraces methods and systems for adjusting/adapting a speech recognition system for a hypothesis on a part-by-part basis. A hypothesis may be divided into sequential, non-overlapping hypothesis parts. The adjustments/adaptation for each hypothesis part are independent from the other hypothesis parts. Determining a hypothesis part requires an expected response part. In some cases, knowledge of previous expected response parts may also help in determining the current hypothesis part.

In one aspect, the invention embraces a method for accepting or rejecting hypothesis words in a hypothesis part using an adjustable acceptance threshold as part of a speech recognition system. The method includes the step of receiving a speech input from a user with a speech recognition system comprising a microphone, processor, and memory. The speech input is processed to generate a hypothesis. The method next includes the step of determining a hypothesis part from the hypothesis. The hypothesis part corresponds to an expected response part stored in the memory. The hypothesis part has at least one hypothesis word. Each hypothesis word has a corresponding confidence score. An acceptance threshold for each hypothesis word in the hypothesis part is adjusted if the hypothesis part matches word-for-word the expected response part. Otherwise, the acceptance threshold is not adjusted. Next, each hypothesis word in the hypothesis part is compared to its acceptance threshold and the hypothesis words are either accepted or rejected based on this comparison.

In another aspect, the invention embraces a method for marking hypothesis words in a hypothesis part as suitable for adaptation in a speech recognition system. The method includes the step of receiving a speech input from a user with a speech recognition system comprising a microphone, processor, and memory. The speech input is processed to generate a hypothesis. The method next includes the step of determining a hypothesis part from the hypothesis. The hypothesis part corresponds to an expected response part stored in the memory. The hypothesis part has at least one hypothesis word. Each hypothesis word is marked as suitable for adaptation if the hypothesis part matches word-for-word the expected response part. Otherwise, no hypothesis words in the hypothesis part are marked as suitable for adaptation.

In an exemplary embodiment, the method includes the step of adapting the models for the hypothesis words marked as suitable for adaptation using acoustic data corresponding to those hypothesis words.

In another aspect, the invention embraces a speech recognition system configured to adjust acceptance thresholds for words in a hypothesis part. The system includes (i) a storage medium for storing information and processor-executable instructions, (ii) a microphone for receiving speech input from a user, and (iii) a computing device comprising a processor communicatively coupled to the storage medium. The processor is configured by the processor-executable instructions in order to perform the steps necessary to adjust (or not) acceptance thresholds for hypothesis words. The first step is to receive speech input from the microphone. The speech input is then processed to determine a hypothesis part. The hypothesis part corresponds to an expected response part stored on the storage medium. Next the hypothesis part's hypothesis words are compared with corresponding expected words in the expected response part. If the hypothesis part matches the expected response part, then the acceptance thresholds for the hypothesis words in the hypothesis part are adjusted.

In another aspect, the invention embraces a speech recognition system configured to mark words in a hypothesis part as suitable for adaptation. The system includes (i) a storage medium for storing information and processor-executable instructions, (ii) a microphone for receiving speech input from a user, and (iii) a computing device comprising a processor communicatively coupled to the storage medium. The processor is configured by the processor-executable instructions in order to perform the steps necessary to mark words in a hypothesis part as suitable for adaptation. The first step is to receive speech input from the microphone. The speech input is then processed to determine a hypothesis part. The hypothesis part corresponds to an expected response part stored on the storage medium. The hypothesis part's hypothesis words are compared with corresponding expected words in the expected response part and if the hypothesis part matches the expected response part then the hypothesis words are marked suitable for adaptation.

The foregoing illustrative summary, as well as other exemplary objectives and/or advantages of the invention,

DETAILED DESCRIPTION

Speech recognition has simplified many tasks in the workplace by permitting hands-free communication with a computer. A user may enter data by voice using a speech recognizer and commands or instructions may be communicated to the user by a speech synthesizer.

Figure 1:
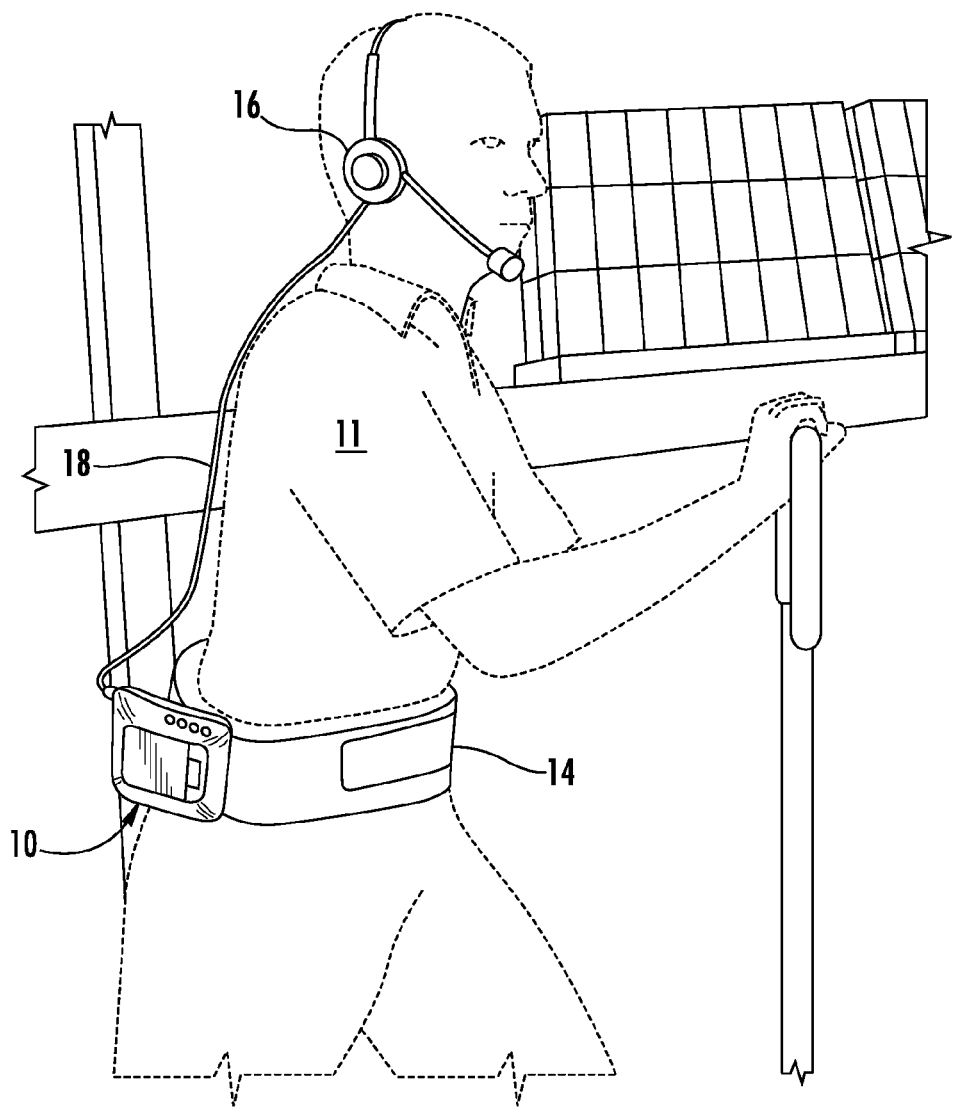
FIG. 1 illustrates a perspective view of a user with an exemplary speech recognition system.

FIG. 1 illustrates a perspective view of a user using a wireless wearable computer 10 and headset 16, according to an example embodiment of the invention. Here, the wireless wearable computer 10 may be worn by a user 11 on a belt 14 as shown. The wireless wearable computer 10 may include processing circuitry for controlling the operation of the wireless wearable computer and other associated processing circuitry. The headset 16 may be coupled to the portable computer by a cord 18 or by a wireless connection (not shown in FIG. 1) and the headset is worn on the head of the user 11. In another exemplary embodiment, the speech recognition system is located in headset 16, eliminating the need for wireless wearable computer 10 or belt 14. A user can speak in an utterance, through a microphone in the headset 16 and the acoustic data is processed by the speech recognition system in portable computer 10. Wireless wearable computers can provide a worker performing work-related tasks with desirable computing and data-processing functions while offering the worker enhanced mobility within the workplace.

One particular area in which workers rely heavily on such wireless wearable computers is inventory management. Inventory-driven industries rely on computerized inventory management systems for performing various diverse tasks, such as food and retail product distribution, manufacturing, and quality control. An overall integrated management system involves a combination of a central computer system for tracking and management, and the people who use and interface with the computer system in the form of order fillers, pickers and other workers. The workers handle the manual aspects of the integrated management system under the command and control of information transmitted from the central computer system to the wireless wearable computer.

As the workers complete their assigned tasks, a bi-directional communication stream of information is exchanged over a wireless network between wireless wearable computers and the central computer system. Information received by each wireless wearable computer from the central computer system is translated into voice instructions or text commands for the corresponding worker. Typically, the worker wears a headset coupled with the wearable device that has a microphone for voice data entry and an ear speaker for audio output feedback to the user. Responses from the worker are input into the wireless wearable computer by the headset microphone and communicated from the wireless wearable computer to the central computer system. Through the headset microphone, workers may pose questions, report the progress in accomplishing their assigned tasks, and report working conditions (e.g., inventory shortages). Using such wireless wearable computers, workers may perform assigned tasks virtually hands-free without equipment to juggle or paperwork to carry. Because manual data entry is eliminated or, at the least, reduced, workers can perform their tasks faster, more accurately, and more productively.

Figure 2:
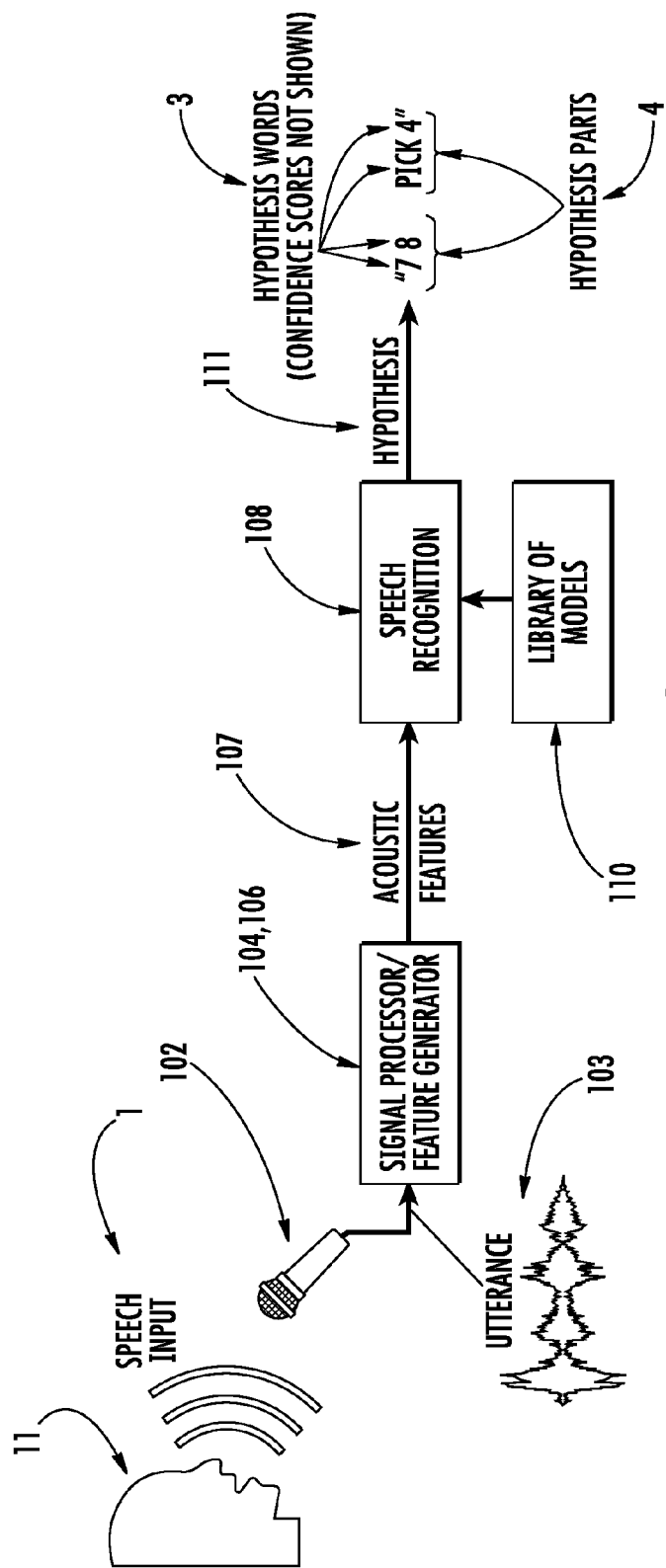
FIG. 2 graphically depicts the process of gathering speech to produce a hypothesis with concatenated hypothesis parts.

FIG. 2 illustrates a schematic view of a speech recognition system, according to an example embodiment of the invention. The invention can be implemented using various hardware and/or software configurations. One particular implementation is within a portable or wearable computer that is used for voice-directed work. Other implementations are possible as well, and the invention is not limited to such voice-directed work applications.

In the course of a dialog, a user 11 vocalizes a speech input 1 (i.e., utterance) into an input device 102 (e.g., microphone). The input device 102 converts this sound into an electronic signal 103 that is digitized and processed in order to generate a set of features 107 representing the speech. The digitized sound or any data derived from it that describe the acoustic properties of the sound, such as the features 107, are known as acoustic data. A speech recognition system 108 may attempt to find matches for the acoustic features 107 in a library of models 110. The speech recognizer algorithms executed by a processor assess the received speech input using stored acoustic models to determine the most likely word, or words, that were spoken (i.e., the hypothesis 111). The hypothesis may include a plurality of concatenated hypothesis parts 4. Each part in the hypothesis may include at least one hypothesis word 3.

Figure 3:
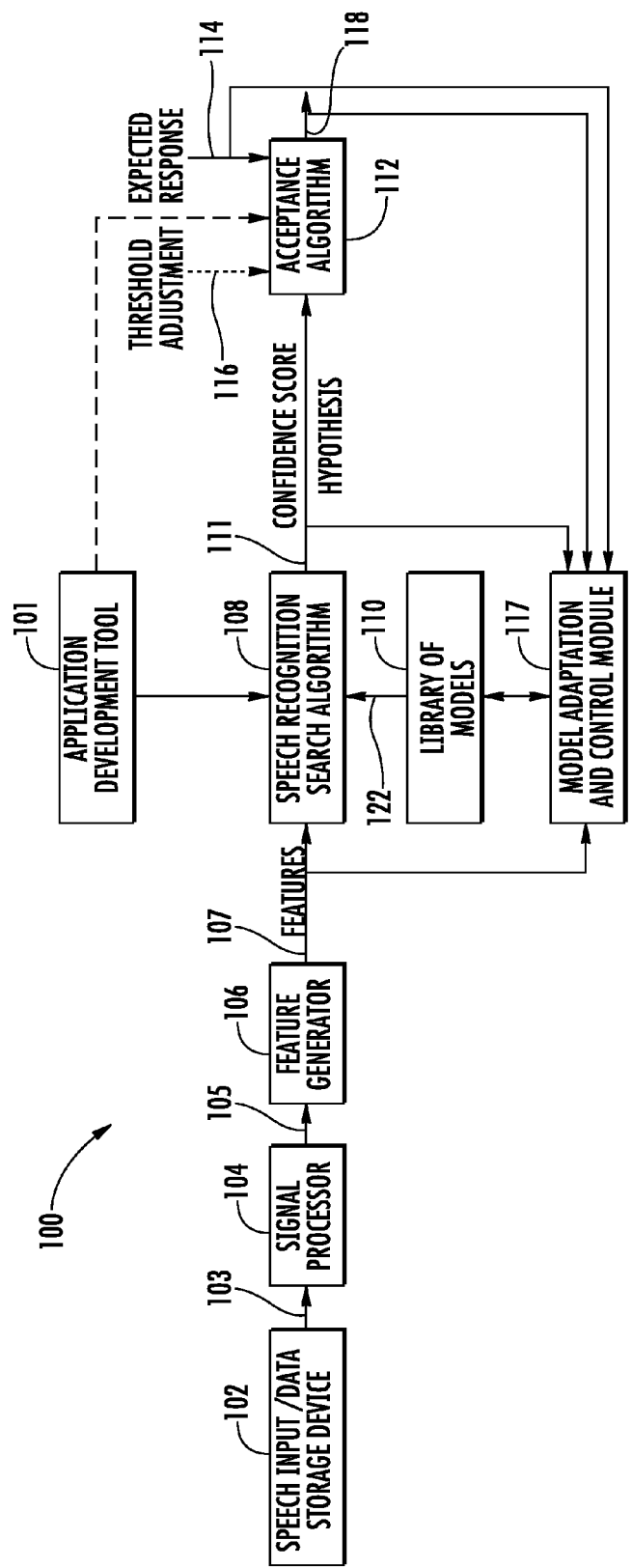
FIG. 3 illustrates a schematic view of an exemplary system for recognizing speech.

As shown in FIG. 3, a voice-application development tool (i.e., application development tool 101) allows a voice application developer to specify the vocabulary items and grammar that are available to be recognized at a response point of a dialog. At least one such voice application-development tool 101 exists separate and apart from the speech recognition system 100. The outputs of the tool 101 are used by the speech recognition system 100 to define the behavior of the speech recognition system. For example, using an interface of the voice application-development tool, a developer specifies what information is to be delivered to a user of the speech recognition system, such as what sentences or questions with which the system will prompt the user. The developer also specifies what responses the speech recognizer should attempt to recognize. For example, using a voice application development tool 101, a developer can specify that the voice application prompts the user "What is the quantity?" and that the voice application should listen for the vocabulary items "one", "two", "three", "four", "five", or "six".

Referring again to FIG. 3 in a speech recognition system 100, a speech signal, such as from a system user, may be captured by a speech input device 102 in a variety of conventional ways. Typically, a microphone or other electro-acoustical device senses speech input from a user (i.e., utterance) and converts it into an analog voltage signal 103 that then is transmitted to a signal processor 104. The signal processor 104 includes the necessary analog-to-digital converters, filters, and equalization circuitry and/or software that convert the analog speech input 103 into a digitized stream of data 105 that can be separated into separate units for analysis. Alternatively, this audio data can be retrieved from a data storage device. As discussed herein, the system 100 might be realized by suitable hardware and/or software. As such, the blocks shown in FIG. 3 are not meant to indicate separate circuits or to be otherwise limiting, but rather show the functional components of the system. Further explanation of an example speech recognition system is provided in U.S. Pat. No. 4,882,757, entitled "Speech Recognition System", which is incorporated herein by reference in its entirety.

The signal processor 104 divides the digital stream of data that is created into a sequence of time-slices, or frames 105, each of which is then processed by a feature generator 106, thereby producing features (e.g., vector, matrix, or otherwise organized set of numbers representing the acoustic features of the frames) 107. These features may be the result of Linear Predictive Coding (LPC), but other methods are contemplated within the scope of the invention as well.

A speech recognition search algorithm function 108, realized by an appropriate circuit and/or software in the system 100, analyzes the features 107 in an attempt to determine what hypothesis to assign to the speech input captured by input device 102. In a possible embodiment, the recognition search 108 relies on probabilistic models 122 retrieved from a library of suitable models 110. Each of the models in the library 110 may be customized to a user or may be generic to a set of users.

The search algorithm 108 (e.g., a modified Viterbi algorithm) assesses the features 107 generated in the feature generator 106 using reference representations of speech, or speech models (e.g., hidden Markov models, DTW templates, or neural networks), in library 110 in order to determine the word (or words) that best match the speech input from device 102. Part of this recognition process is to assign one or more confidence scores 111 that quantitatively indicate how confident the recognizer is that its hypothesis 111 is correct. As such, a hypothesis consisting of one or more vocabulary items (i.e., words) and associated confidence scores 111 is directed to an acceptance algorithm 112, which also can take as inputs a threshold adjustment 116 and one or more expected responses 114. A confidence score may be assigned to one hypothesized word (i.e., hypothesis word) or one confidence score can be associated with multiple hypothesized words. If the confidence score is above a predetermined acceptance threshold (or an adjusted threshold when the hypothesis matches the expected response), then the acceptance algorithm 112 makes a decision 118 to accept the hypothesis as recognized speech. If, however, the confidence score is not above the acceptance threshold (including any adjustment), then the acceptance algorithm 112 makes a decision 118 to ignore or reject the recognized speech. The system may then prompt the user to repeat the speech. In this instance, the user may repeat the speech to input device 102.

The hypothesis and confidence scores 111, the expected response 114, acceptance algorithm decision 118, and features 107 may also be input to a model adaptation and control module 117. The model adaptation and control module 117 (which may be implemented in a hardware or software controller or control mechanism) controls the adaptation of the library of models 110. This library adaptation may occur at times other than during the speech recognition process, for example, automatically according to a periodic update schedule, executed by a user, or after some minimum amount of data has been obtained for adaptation.

Figure 4:
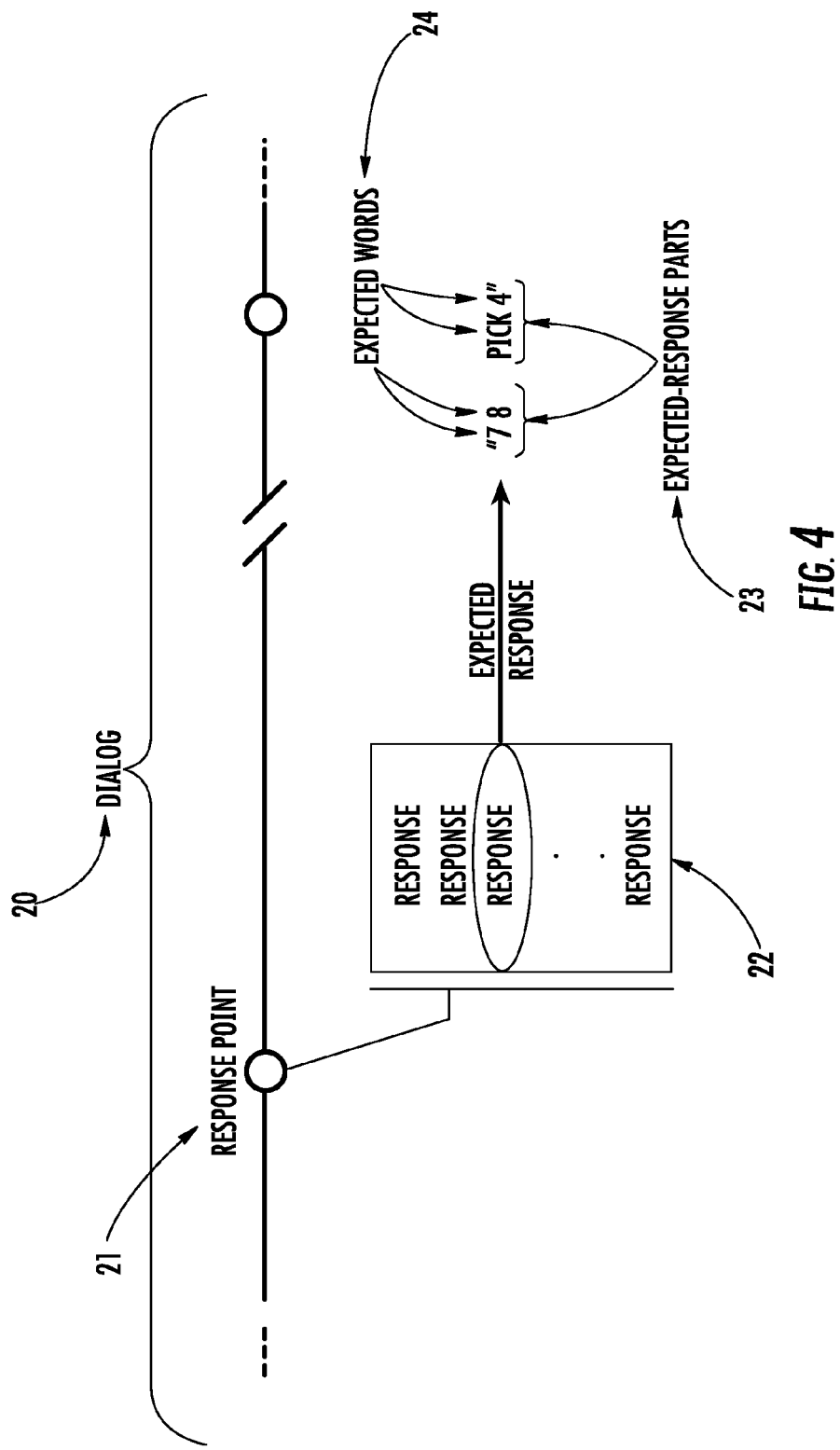
FIG. 4 graphically depicts an exemplary dialog illustrating an expected response with concatenated expected response parts.

As shown in FIG. 4, the expected response is one of many possible responses associated with a response point in a dialog 20. For example, the dialog could prompt a user to indicate check-digits (e.g., 78) associated with a location (i.e., a code to verify that the user is at a location), an action (e.g., pick), and a quantity (e.g., four). At the response point 21, the user would respond with a speech input. The most likely response is chosen from all possible responses 22 in a grammar associated with the response point. Here this expected response is "78 pick four". This expected response may be subdivided further to include expected response parts 23. The first expected response part shown in FIG. 4 is the check digit part (i.e., "78") while the second expected response part is the action and quantity part, (i.e., "pick four"). Note that it's not necessary for all expected response parts to be known before the recognizer starts processing the utterance; for example, some parts may not be defined until part of the utterance has been recognized. Each expected response part is made of expected words 24. If a mismatch is detected (i.e., a hypothesis word does not match an expected word) in one part, this part does not affect the other part's possible system adaptations (e.g., threshold adjustment, model adaptation, or error estimation). This subdivision and independence leads to more versatile adaptation and more accurate error estimation.

Figure 5:
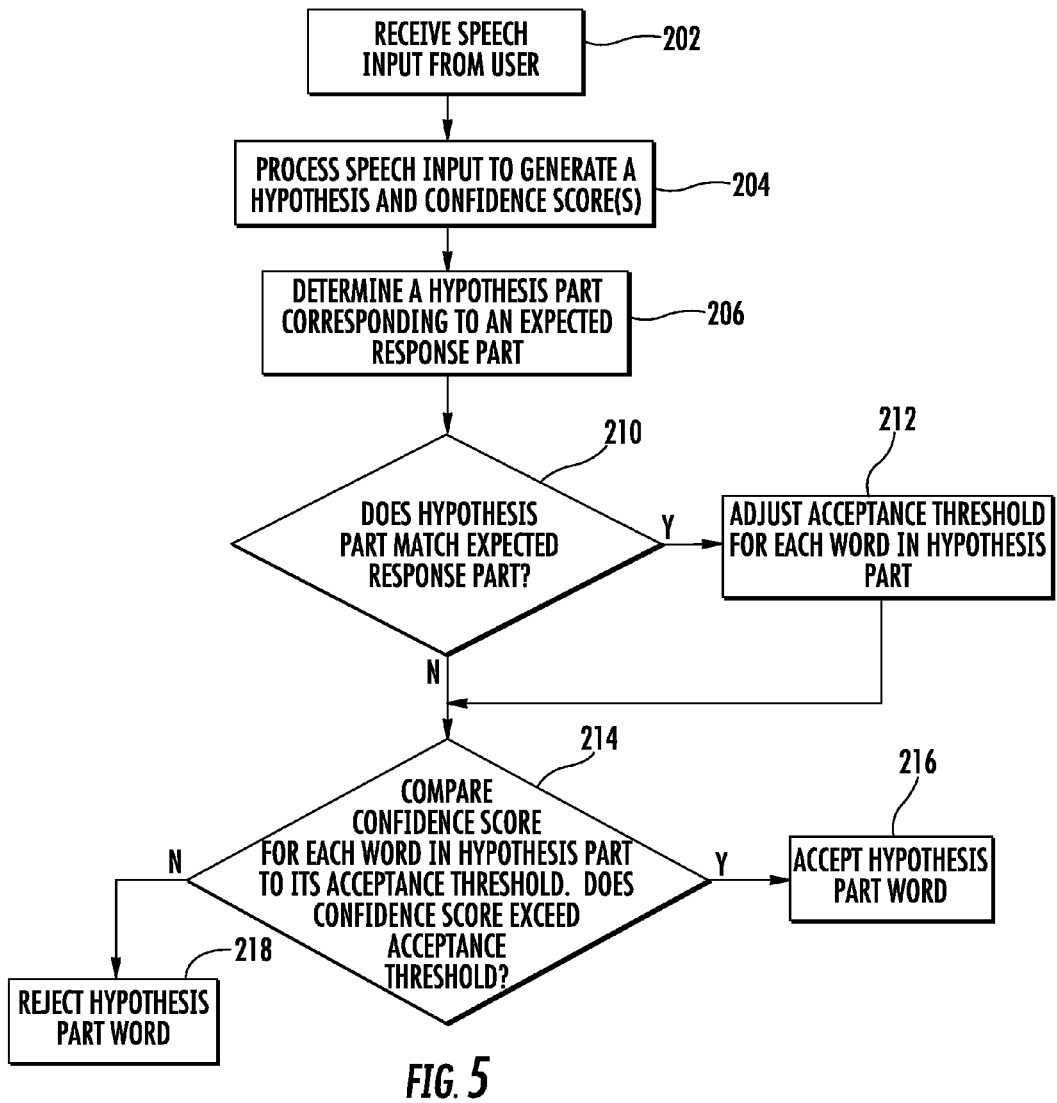
FIG. 5 illustrates a flowchart of an exemplary method for accepting or rejecting hypothesis words in a hypothesis part using an adjustable acceptance threshold.

A flowchart of an exemplary acceptance algorithm 112 including threshold adjustment is shown in FIG. 5. In step 202, speech input is received from the user by an appropriate device 102 or is retrieved from a storage device. The speech input is then processed in step 204 to generate a hypothesis. The hypothesis has hypothesis words and each hypothesis word has an associated confidence score. Each word may have its own confidence score or more than one hypothesis word may share a common confidence score. The hypothesis may be considered as a concatenated sequence of non-overlapping hypothesis parts. These parts are typically processed and analyzed in the sequence that they were received. The hypothesis is split into hypothesis parts to correspond to the expected response parts. Step 206 determines a hypothesis part corresponding to an expected response part stored in a computer readable memory. This hypothesis part is evaluated independently from the other parts. In step 210, the hypothesis part is compared to the expected response part. If the hypothesis part matches the expected response part (i.e., each hypothesis word matches its corresponding expected word), then the threshold for each hypothesis word in the hypothesis part is adjusted 212. The amount and type (i.e., raise or lower) of the threshold adjustment may depend on the application and may be different for each word in the hypothesis. If the hypothesis part does not match its corresponding expected response part (e.g., wrong word, missing word, unintelligible word, etc.), then no acceptance thresholds are adjusted and all of them remain set to their initial values.

Adjusting the acceptance thresholds for each word in a hypothesis part that matches its corresponding expected response part may allow these words to be more readily accepted. In this regard, acceptance thresholds are typically lowered to make acceptance easier, however different configurations may be envisioned. For the exemplary method shown in FIG. 5, Step 214 compares the confidence score (e.g., the confidence score generated by the speech recognition search algorithm 108) for each word in the hypothesis part to its acceptance threshold (i.e., the acceptance threshold that may or may not have been adjusted). If the confidence score for a hypothesis word exceeds its acceptance threshold, then the hypothesis word is accepted 216. If, however, the confidence score for a hypothesis word does not exceed its acceptance threshold then the word is rejected 218.

Figure 6:
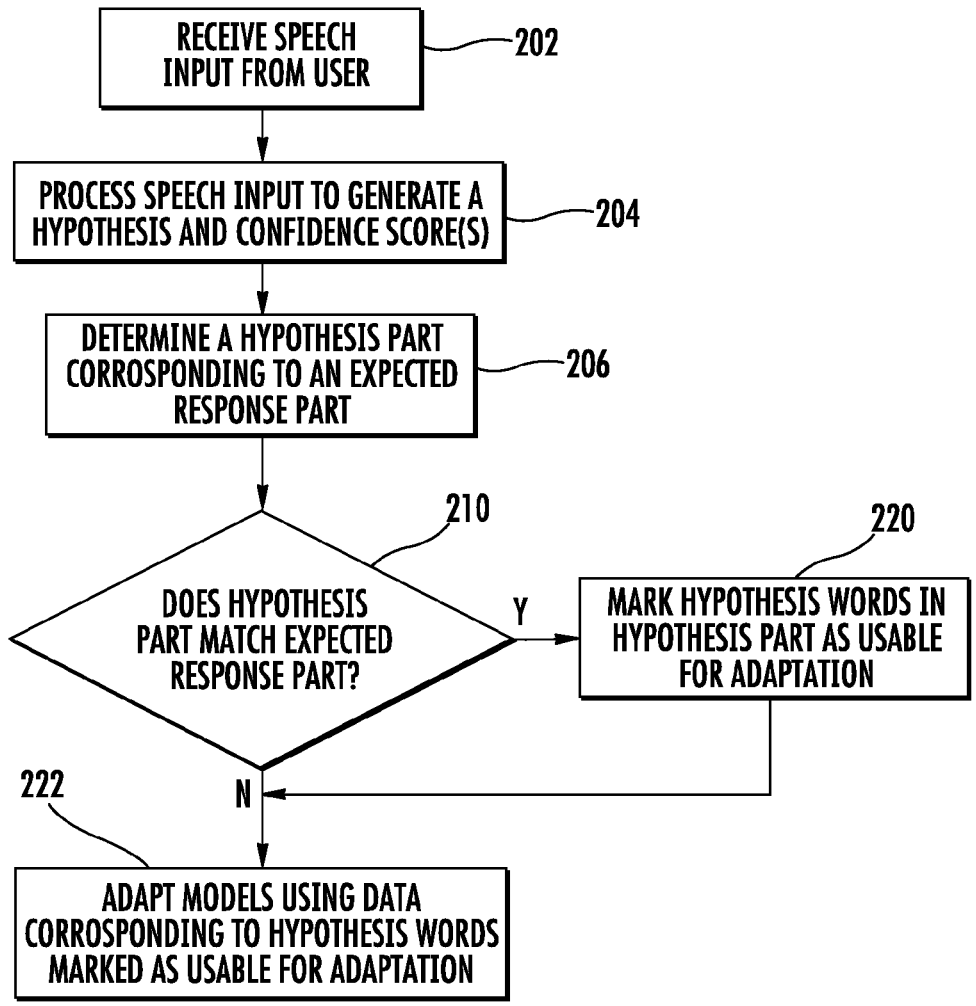
FIG. 6 illustrates a flowchart of an exemplary method for marking hypothesis words in a hypothesis part as suitable for adaptation.

A flowchart of an exemplary model adaptation algorithm 117 is shown in FIG. 6. In step 202, speech input is received from the user by an appropriate device 102 or is retrieved from a storage device. The speech input is then processed in step 204 to generate a hypothesis. The hypothesis has hypothesis words and each hypothesis word has an associated confidence score. Each word may have its own confidence score or more than one hypothesis word may share a common confidence score. The hypothesis may be considered as a concatenated sequence of non-overlapping hypothesis parts. These parts are typically processed and analyzed in the order that they were received. The hypothesis is split into hypothesis parts to correspond to the expected response parts. Step 206 determines a hypothesis part corresponding to an expected response part stored in a computer readable memory. This hypothesis part is evaluated independently from the other parts. In step 210, the hypothesis part is compared to the expected response part. If the hypothesis part matches the expected response part, each hypothesis word is marked as suitable for adaptation. The models for the hypothesis words may then be adapted using the data corresponding to the hypothesis words that are marked as suitable for adaptation. If the hypothesis part does not match the corresponding expected response part then none of the data for the hypothesis part is used for model adaptation.

An example of the use of an expected response is useful to illustrate its features. In this example, it is assumed that there is a single confidence score for each hypothesis part, which includes multiple hypothesis words. In the example, a user may be directed to a particular bin or slot and asked to speak the check-digits assigned to that bin or slot to verify his location in a warehouse. For the purpose of this example, it is assumed that the check-digit is "one one", and the acceptance threshold for the system is set to 1.5. Various scenarios may arise in this situation.

In the first scenario, the user speaks the correct check-digits and the search algorithm produces "one one" as the hypothesis, with a confidence score of 2. In this case, the check-digits are accepted because the confidence score exceeds the acceptance threshold and the user continues with the task.

In the second scenario, the user speaks the correct check-digits and the search algorithm again produces "one one" as the hypothesis. However, in this later scenario, the hypothesis is only assigned a confidence score of 1. This hypothesis would normally be rejected because the confidence score is lower than the acceptance threshold of 1.5. The user might then be asked to repeat the speech causing a delay or inefficiency.

The invention disclosed herein embraces a system that takes into account the expected response (i.e., what the user is most likely to say at a given response point). Specifically, the system may know the expected check-digit response from the user based on knowledge of the bin or slot to which the system prompted the user to go. The invention makes a comparison of the hypothesis to the expected response. If the hypothesis matches the expected check-digit response for the user's location, the acceptance threshold is lowered, such as to 0.5 for example. Now the confidence score (1) exceeds the acceptance threshold (0.5). The check-digit response of "one one" is then accepted and the user continues with the task without having to repeat the check-digits. This change constitutes savings of time leading to higher efficiency and productivity.

In a third scenario, the search algorithm produces incorrect check-digits as its hypothesis (either the user said the wrong check-digits or the speech was recognized incorrectly or the hypothesis was produced due to background noise and not user speech), e.g. "one two", with a confidence score of 1. Since the hypothesis does not match the expected response, which in this example is/are the check-digits at the user's location (i.e., bin/slot), the acceptance threshold is not adjusted or lowered. Therefore, since the confidence score is below the acceptance threshold, the hypothesis is rejected. Therefore, the use of an expected response does not cause acceptance of the wrong response.

In a fourth scenario, the search algorithm produces incorrect check-digits as its hypothesis (either the user said the wrong check-digits or the speech was recognized incorrectly or the hypothesis was produced due to background noise and not user speech), e.g. "one two." However, now the hypothesis has a confidence score of 2. Since the confidence score exceeds the rejection threshold (1.5), the hypothesis is accepted and the user is alerted that the check-digits are incorrect.

To illustrate the invention, in a possible scenario, the user may be directed to a particular slot and asked to speak the check digits as well as the quantity picked, for example "one two pick three", where "one two" is the check digit and "pick three" represents the quantity picked entry. In the previous invention, the expected response would be "one two pick three" and any mismatch between the hypothesis and the expected response would cause the acceptance threshold not to be adjusted. For example if the user said "one two pick two", the acceptance thresholds would remain unchanged even though the user has confirmed the correct location and may be picking fewer items for one of many reasons (e.g., not enough items on the shelf to pick from). In the new invention, the expected response would be divided into parts, as would the hypothesis. In the example above, the expected response would have "one two" as the first part corresponding to the check digit and "pick three" as a second part corresponding to the quantity. The hypothesis would then be split into parts and compared to the expected response. Again, in the example above, the first part of the hypothesis "one two" would be compared to the first expected response part, resulting in a match and causing the acceptance thresholds corresponding to these words to be adjusted. The second part of the hypothesis, "pick two", would be compared to the second part of the expected response, "pick three", and would not match, causing the acceptance thresholds corresponding to those words not to be adjusted. The current invention then provides an advantage that allows some of the acceptance thresholds to be adjusted even when the entire hypothesis does not match the entire expected response. The system designer has the responsibility of designating which words in the expected response can be grouped into expected response parts that make logical sense from a workflow or data entry standpoint.

In accordance with the invention, to perform the comparison of the hypothesis parts to the expected response parts, the hypothesis must be broken into parts. The system must determine which portions (e.g., words) of the hypothesis correspond to each part of the expected response. This determination can be made in any of a number of ways as appropriate for the application at hand. One such method is to align words in the hypothesis to the sequentially corresponding words in an expected response, and breaking the hypothesis into parts at the same relative positions as their corresponding expected response parts. Another, more robust method is to use an alignment algorithm such as the Needleman-Wunsch algorithm for sequence alignment. This latter algorithm is particularly useful when, for example, an extra word is inserted into the hypothesis by the recognizer or a spoken word is deleted from the hypothesis by the recognizer. It is also useful when the recognizer may output garbage words (i.e., word placeholders that are intended to match sounds other than the available vocabulary words, such as grunts, breaths or out of vocabulary words) in a hypothesis. Once the hypothesis part corresponding to an expected response part is identified, error detection algorithms (such as "Substitution rate", "Substitute and repeat", and "Low Confidence Rate" described in U.S. Pat. No. 8,374,870, and incorporated herein by reference in its entirety) can be used to estimate errors using it, where a hypothesis part is used in place of a hypothesis, and an expected response part is used in place of an expected response.

According to the method detailed in FIG. 5, speech input is first analyzed and processed by the recognizer to determine the most likely match or hypothesis. Unlike previous methods that use a hypothesis as a single unit, the present invention compares the hypothesis words in a hypothesis part to expected words in an expected response part. If the expected response part and the hypothesis part are the same, then the acceptance threshold for each hypothesis word in the hypothesis part is adjusted such that acceptance of the hypothesis words is more likely.

Likewise, as shown in FIG. 6, if the expected response part and the hypothesis part are the same, the acoustic data for the words in the hypothesis part may be used to modify their respective models in the library.

Furthermore, the hypothesis can be assumed to be correctly recognized and logged for use in future error rate calculations (not shown). In cases where there is an apparent error, such as a mismatch between the hypothesis part and the expected response part, then the error may be logged for a future error rate calculation. Error rates can be used for a variety of diagnostics and metrics. An error rate can also be used as a trigger for adapting a model.

Model adaptation can be executed by a component of a speech recognition system, such as model adaptation and control module 117, shown in FIG. 3. In some cases a determination is made whether to adapt (such as by the processing of the model adaptation and control module 117) a model for a word (or various models for various words), based on an error rate. For example, a determination can be made to adapt the model for the word '1' based on an error rate for the word '1'. Model adaptation can be performed in the background. In other words, the speech recognition system can continue to receive and process speech while the models are being adapted.

There are various example embodiments for determining or estimating the occurrences of possible (or potential or suspected) errors made by a speech recognition system and an error rate. Exemplary error rates may be based on estimated errors, which are deemed to have occurred based on evaluating system behavior, the expected response, and/ or user behavior. Thus, these estimated error rates provide an advantage of not requiring a reference transcript of words input to the system and comparison of the reference transcript to the system's hypotheses.

In an example embodiment of the invention, an identification or count of occurrences of possible errors made by a speech recognition system called low confidence recognitions can be used to determine an estimate of a low confidence rate or an estimate of an error rate. The low confidence rate is the rate at which a word is recognized with a confidence score within a certain range corresponding to low confidence that the system recognized the word correctly. In other words, the low confidence rate is the frequency at which a word was recognized by the speech recognition system with a confidence score that is relatively low depending on the recognizer and application in which the speech recognition system is used. Note that a low confidence rate does not necessarily measure errors by the speech recognition system, but the low confidence rate (or a fraction of its value) can be used in addition to or in place of error rate estimates where error rates (or error rate estimates) are used.

An example embodiment also considers when a word is from a hypothesis part that matches an expected response part in counting low confidence recognitions for an error rate estimation. A matching acceptance algorithm of the system requires that words in the hypothesis part be accepted only if their confidence score exceeds an acceptance threshold. When a hypothesis part matches a corresponding expected response part, then the acceptance threshold for each word in the hypothesis part is adjusted to make acceptance easier.

For hypothesis parts that match expected response parts, words that have a relatively low confidence score are counted as errors for an error rate estimation. Even if a recognition error may not have actually occurred, a word with a relatively low confidence score is counted as an error (i.e., low confidence error) for an error rate estimation (i.e., low confidence rate) due to the relatively low confidence score.

The range of confidence scores for which a word is counted as a low confidence error depends on the application. This low confidence score range could be between the adjusted acceptance threshold and the original, unadjusted acceptance threshold. Alternatively, the confidence thresholds or range for the counting of low confidence errors do not need to match the acceptance threshold and adjusted acceptance threshold. The range could be between two other thresholds or below a single threshold.

In an example embodiment of the invention, an identification or count of occurrences of possible recognition errors (such as substitutions, deletions, and insertions) made by a speech recognition system can be used to determine an estimate of a recognition error rate. In an example embodiment, a hypothesis part generated by the speech recognition system is compared to an expected response part, for example, by using an alignment algorithm (such as Needleman-Wunsch). If the hypothesis part and expected response part match or mostly match, the comparison results can be used to estimate correct counts, error counts, and rates. A correct recognition is counted when a word in the hypothesis part matches its corresponding word in the expected response part. A recognition error is counted if any of the words or gaps in the hypothesis part do not match the corresponding words or gaps in the expected response part to which they were aligned. As illustrated in the examples below, the alignment algorithm may introduce "gap words", if necessary to produce a good alignment. In particular, a substitution error is counted when a word in the hypothesis part and its corresponding word in the expected response part do not match; an insertion error is counted if the alignment algorithm did not align a hypothesis word to any particular expected response word and instead introduces a gap in the expected response part in the alignment; and, a deletion error is counted if the alignment algorithm did not align an expected response word to any particular hypothesis word, and introduced a gap in the hypothesis part in the alignment instead.

In the following examples, assume the expected response is "1-2-3". If a hypothesis is "1-5-3", a substitution error is counted because it is deemed that the system made one substitution error: substituting the '5' for the '2'. If the hypothesis is instead, "1-2-6-3", an insertion error would be counted because it is deemed that the system made an error by inserting the '6'. Similarly, if the hypothesis is "1-3", a deletion error would be counted because it is deemed that the system made an error and deleted the '2'.

In other words, if the hypothesis part and the expected response part do not match word-for-word, but do mostly match, (i.e. the hypothesis part and the expected response part match except for a predetermined number of words), it is a reasonable conclusion that a word recognition error has occurred. The threshold for matching depends upon the application. For example, a system might increment a recognition error count when each word in a three word expected response part matches its corresponding word in a hypothesis part except for one word.

It should be understood that even though substitution, insertion, deletion errors, and low confidence recognitions are collectively referred to as recognition errors, they might be calculated and used independently or in combination.

Figure 7:
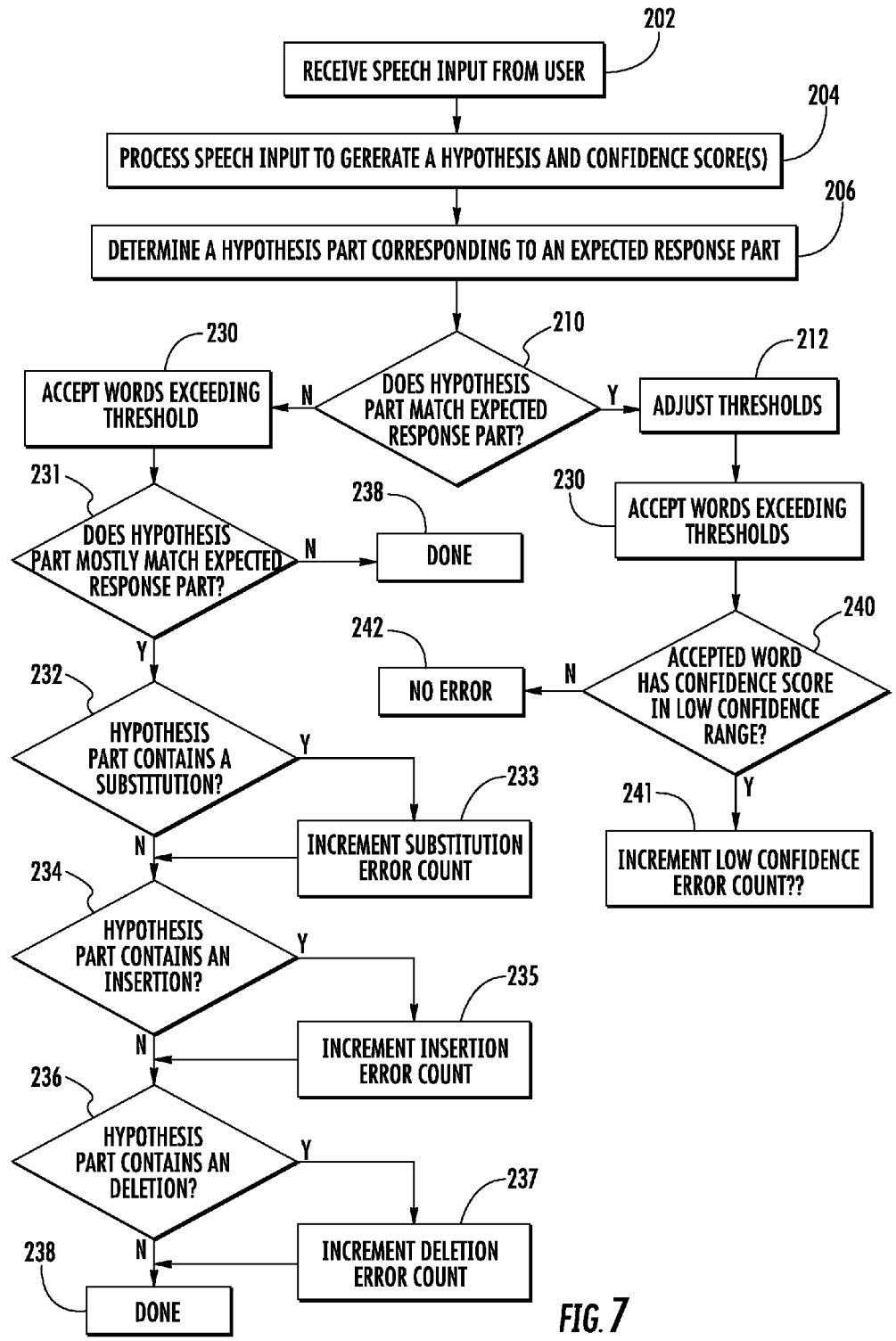
FIG. 7 illustrates a flowchart of an exemplary method for counting errors and correct recognitions in a speech recognition system using hypothesis parts.

An exemplary method for counting errors and correct recognitions in a speech recognition system using hypothesis parts is shown in FIG. 7. Here, in step 202 speech input is received from a user by an appropriate device 102. The speech input is processed in step 204 to generate a hypothesis. The hypothesis has hypothesis words and each hypothesis word has an associated confidence score. The hypothesis is split into hypothesis parts to correspond to expected response parts. Step 206 determines a hypothesis part corresponding to an expected response part stored in a computer readable memory. This hypothesis part is evaluated independently from the other parts. In step 210, the hypothesis part is compared to the expected response part. In one possible embodiment, if the hypothesis part matches the expected response part (i.e., each hypothesis word matches its corresponding expected word), then the threshold for each hypothesis word in the hypothesis part is adjusted 212. If, however, the hypothesis part does not match the expected response part, then no acceptance thresholds are adjusted, but rather remain at their default value. In either case, the confidence score for each hypothesis word is compared to the acceptance threshold (adjusted or not) 230 and hypothesis words with confidence scores exceeding their corresponding thresholds are accepted.

The hypothesis parts may be analyzed to determine recognition errors of various types. The number of recognition errors in a hypothesis part may be added to a running total of recognition errors (i.e., error count) for the recognition system. Likewise, the number of correct recognitions for a hypothesis part may be added to a running total of correct recognitions for the recognition system (i.e., correct count). These counts may be stored in memory for future use in system performance analysis. For example, the speech recognition system's error rate may be computed using this data. In addition, the error/correct count data may be used to provide a particular user's error rate.

As mentioned previously, recognition errors of various types may be tabulated and used independently or in combination. The exemplary embodiment shown in FIG. 7 counts recognition errors of various types. For example, if the hypothesis part does not match the expected response but does match a significant portion of the expected response (e.g., matches all words except for one) 231, then the hypothesis may be examined for substitution, insertion, or deletion errors.

As shown in FIG. 7, if the hypothesis part contains a substitution error 232, then the substitution error count is incremented 233. If the hypothesis part contains an insertion error 234, then the insertion error count is incremented 235. If the hypothesis part contains a deletion error 236, then the deletion error count is incremented 237. The error counting process ends 238 if either the hypothesis part does (i) not significantly match the expected response part or (ii) once all substitution, insertion, and deletion errors are counted.

If the hypothesis part matches the expected response part, then the confidence scores for the hypothesis words may be analyzed to find words with low confidence scores (e.g., scores that are in a low confidence range) 240. If a word in the hypothesis part is found to have a low confidence score then the low confidence error count may be incremented 241. If the word does not have a low confidence level, then no error has occurred 242.

To supplement the present disclosure, this application incorporates entirely by reference the following commonly assigned patents, patent application publications, and patent applications:
U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;

U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;

U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application Ser. No. 29/468,118 for an Electronic Device Case, filed Sep. 26, 2013 (Oberpriller et al.);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Checkout Shopping System, filed Nov. 8, 2013 (Hejl et al.);
U.S. patent application Ser. No. 14/074,787 for Method and System for Configuring Mobile Devices via NFC Technology, filed Nov. 8, 2013 (Smith et al.);
U.S. patent application Ser. No. 14/087,190 for Optimal Range Indicators for Bar Code Validation, filed Nov. 22, 2013 (Hejl);
U.S. patent application Ser. No. 14/094,087 for Method and System for Communicating Information in an Digital Signal, filed Dec. 2, 2013 (Peake et al.);
U.S. patent application Ser. No. 14/101,965 for High Dynamic-Range Indicia Reading System, filed Dec. 10, 2013 (Xian);
U.S. patent application Ser. No. 14/150,393 for Indicia-reader Having Unitary Construction Scanner, filed Jan. 8, 2014 (Colavito et al.);
U.S. patent application Ser. No. 14/154,207 for Laser Barcode Scanner, filed Jan. 14, 2014 (Hou et al.);
U.S. patent application Ser. No. 14/165,980 for System and Method for Measuring Irregular Objects with a Single Camera filed Jan. 28, 2014 (Li et al.);
U.S. patent application Ser. No. 14/166,103 for Indicia Reading Terminal Including Optical Filter filed Jan. 28, 2014 (Lu et al.);
U.S. patent application Ser. No. 14/200,405 for Indicia Reader for Size-Limited applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTION CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTI-FUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for accepting or rejecting hypothesis words in a hypothesis part using an adjustable acceptance threshold as part of a speech recognition system, the method comprising:
    receiving a single speech input from a user, the speech input comprising a first speech input part and a second speech input part, the first speech input part and the second speech input part each having information independent from the other speech input part;
    processing the single speech input to generate a single hypothesis comprising a sequence of a first hypothesis part corresponding to the first input part and a second hypothesis part corresponding to the second input part, each of the first hypothesis part and the second hypothesis part having one or more hypothesis words, and each hypothesis word having a corresponding confidence score;
    independently comparing each of the first hypothesis part and the second hypothesis part with a first expected response part and a second expected response part, respectively, the first expected response part and the second expected response part having information different and independent from the other expected response part, and the first expected response part being independently compared with the first hypothesis part and the second expected response part being independently compared with the second hypothesis part, and using boundaries between the first or the second expected response parts to determine boundaries between the first or the second hypothesis parts respectively;
    adjusting an acceptance threshold for each hypothesis word in the first hypothesis part if the first hypothesis part matches word-for-word the first expected response part, otherwise not adjusting the acceptance threshold for each hypothesis word in the first hypothesis part, and independently adjusting an acceptance threshold for each hypothesis word in the second hypothesis part if the second hypothesis part matches word-for-word the second expected response part, otherwise not adjusting the acceptance threshold for each hypothesis word in the second hypothesis part;
    comparing the confidence score for each hypothesis word in each of the first hypothesis part and second hypothesis part to its acceptance threshold; and
    accepting or rejecting each hypothesis word in each of the first hypothesis part and the second hypothesis part based on the results of the comparison.

2. The method according to claim 1, wherein after a first hypothesis part is evaluated, the steps of determining, adjusting, comparing, and accepting or rejecting are repeated for subsequent hypothesis parts until all hypothesis parts comprising the hypothesis have been evaluated.

3. The method according to claim 1, comprising dividing the hypothesis into sequential and non-overlapping hypothesis parts.

4. The method according to claim 1, comprising (i) accepting a hypothesis word when the hypothesis word's confidence score exceeds the hypothesis word's acceptance threshold and (ii) rejecting a hypothesis word when the hypothesis word's confidence score does not exceed the hypothesis word's acceptance threshold.

5. The method according to claim 1, wherein each hypothesis word is assigned a default acceptance threshold prior to adjustment.

6. The method according to claim 1, wherein the acceptance threshold adjustment for a hypothesis word in a hypothesis part does not affect acceptance threshold adjustments for any other hypothesis word in the hypothesis part.

7. A method for marking hypothesis words in a hypothesis part as suitable for adaptation in a speech recognition system, the method comprising:
    receiving a single speech input from a user with a speech recognition system comprising a microphone, processor, and memory, the speech input comprising a first speech input part and a second speech input part, the first speech input part and the second speech input part each having information independent from the other speech input part;
    processing the single speech input to generate a hypothesis comprising a sequence of a first hypothesis part corresponding to the first input part and a second hypothesis part corresponding to the second input part, each of the first hypothesis part and the second hypothesis part having one or more hypothesis words;
    independently comparing each of the first hypothesis part and the second hypothesis part with a first expected response part and a second expected response part, respectively, the first expected response part and the second expected response part having information different and independent from the other expected response part, and the first expected response part being independently compared with the first hypothesis part and the second expected response part being independently compared with the second hypothesis part, and using boundaries between the first or the second expected response parts to determine boundaries between the first or the second hypothesis parts respectively; and
    marking each hypothesis word in the first or the second hypothesis part as suitable for adaptation if the first or the second hypothesis part matches word-for-word the first or the second expected response part, otherwise not marking any hypothesis word in the first or the second hypothesis part as suitable for adaptation.

8. The method according to claim 7, wherein the step of determining a hypothesis part corresponding to an expected response part stored in the memory comprises using boundaries between expected response parts to determine boundaries between hypothesis parts.

9. The method according to claim 8, comprising dividing the hypothesis into sequential and non-overlapping hypothesis parts.

10. The method according to claim 7, comprising adapting the models for the hypothesis words marked as suitable for adaptation using acoustic data corresponding to those hypothesis words.

11. The method according to claim 7, comprising not using data corresponding to hypothesis words that are marked as not suitable for adaptation in adapting the models corresponding to those hypothesis words.

12. A speech recognition system configured to adjust acceptance thresholds for words in a hypothesis part, comprising:
    a storage medium for storing information and processor-executable instructions;
    a microphone for receiving speech input from a user;
    a computing device comprising a processor communicatively coupled to the storage medium, the processor configured by the processor-executable instructions to perform the steps of:

(i) receiving the single speech input from the microphone, the speech input comprising a first speech input part and a second speech input part, the first speech input part and the second speech input part each having information independent from the other speech input part, (ii) processing the single speech input to determine a single hypothesis comprising a sequence of a first hypothesis part corresponding to the first input part and a second hypothesis part corresponding to the second input part, each of the first hypothesis part and the second hypothesis part having one or more hypothesis words, the single hypothesis being stored on the storage medium, (iii) independently comparing each of the first hypothesis part and the second hypothesis part with a first expected response part and a second expected response part, respectively, the first expected response part and the second expected response part having information different and independent from the other expected response part, and the first expected response part being independently compared with the first hypothesis part and the second expected response part being independently compared with the second hypothesis part, and using boundaries between the first or the second expected response parts to determine boundaries between the first or the second hypothesis parts respectively, and (iii) if the first or the second hypothesis part matches the first or the second expected response part, then adjusting acceptance thresholds for hypothesis words in the first or the second hypothesis part.

13. The speech recognition system according to claim 12, wherein the hypothesis part is one of a plurality of hypothesis parts which form a hypothesis.

14. The speech recognition system according to claim 13, wherein boundaries between hypothesis parts are determined using boundaries between the expected response parts.

15. The speech recognition system according to claim 13, wherein after a first hypothesis part is evaluated, subsequent hypothesis parts are evaluated in sequence until all hypothesis parts comprising the hypothesis have been evaluated.

16. The speech recognition system according to claim 12, wherein a confidence score corresponding to a hypothesis word is compared to the adjusted acceptance threshold to either accept or reject the hypothesis word as recognized speech.

17. The speech recognition system according to claim 12, wherein the hypothesis part's adjustment is not affected by the matching conditions between any other hypothesis parts and their corresponding expected response parts.

18. A speech recognition system configured to mark words in a hypothesis part as suitable for adaptation, comprising:
   a storage medium for storing information and processor-executable instructions;
   a microphone for receiving speech input from a user;
   a computing device comprising a processor communicatively coupled to the storage medium, the processor configured by the processor-executable instructions to perform the steps of:
   (i) receiving a single speech input from the microphone, the speech input comprising a first speech input part and a second speech input part, the first speech input part and the second speech input part each having information independent from the other speech input part, (ii) processing the single speech input to determine a hypothesis comprising a sequence of a first hypothesis part corresponding to the first input part and a second hypothesis part corresponding to the second input part, each of the first hypothesis part and the second hypothesis part having one or more hypothesis words, the hypothesis being stored on the storage medium, (iii) independently comparing each of the first hypothesis part and the second hypothesis part with a first expected response part and a second expected response part, respectively, the first expected response part and the second expected response part having information different and independent from the other expected response part, and the first expected response part being independently compared with the first hypothesis part and the second expected response part being independently compared with the second hypothesis part, and using boundaries between the first or the second expected response parts to determine boundaries between the first or the second hypothesis parts respectively; and (iii) if the first or the second hypothesis part matches the first or the second expected response part, then marking the hypothesis words in the first or the second hypothesis part as suitable for adaptation.

19. The speech recognition system according to claim 18, wherein acoustic data corresponding to a hypothesis word that is marked as suitable for adaptation is used to adapt a model corresponding to that hypothesis word.

20. The speech recognition system according to claim 18, wherein the hypothesis part's word marking is not affected by the matching conditions between any other hypothesis parts and their corresponding expected response parts.

21. The speech recognition system according to claim 18, wherein acoustic data for the marked hypothesis words is stored on the storage medium for future use.

22. A method for counting errors in a speech recognition system, the method comprising:
   receiving a single speech input from a user with a speech recognition system comprising a microphone, processor, and memory, the single speech input comprising a first speech input part and a second speech input part, the first speech input part and the second speech input part each having information independent from the other speech input part;
   processing the single speech input to generate a hypothesis comprising a sequence of a first hypothesis part corresponding to the first input part and a second hypothesis part corresponding to the second input part, each of the first hypothesis part and the second hypothesis part having one or more hypothesis words, and each hypothesis word having a corresponding confidence score;
   independently comparing each of the first hypothesis part and the second hypothesis part with a first expected response part and a second expected response part, respectively, the first expected response part and the second expected response part having information different and independent from the other expected response part, and the first expected response part being independently compared with the first hypothesis part and the second expected response part being independently compared with the second hypothesis part, the first expected response part and the second response part being stored in the memory, and using boundaries between the first or the second expected response parts to determine boundaries between the first or the second hypothesis parts respectively;

analyzing the first or the second hypothesis part for recognition errors and/or correct recognitions; and adding the number of recognition errors to an error count and adding the number of correct recognitions to a correct count, the error count and correct count representing a running total of recognition errors and correct recognitions respectively.

23. The method according to claim 22, wherein the error count and correct count are stored in the memory.

24. The method according to claim 22, wherein the error count and correct count represent running totals of recognition errors and correct recognitions that correspond to a particular user.

25. The method according to claim 22, comprising determining an error rate for the speech recognition system from the error count and correct count.

26. The method according to claim 22, wherein each hypothesis word has a corresponding confidence score and the recognition errors comprise hypothesis words with low confidence scores.

27. The method according to claim 22, wherein the recognition errors comprise substitution errors.

28. The method according to claim 22, wherein the recognition errors comprise insertion errors.

29. The method according to claim 22, wherein the recognition errors comprise deletion errors.

30. The method according to claim 22, wherein the error count comprises a combination of low-confidence errors, substitution errors, insertion errors, and/or deletion errors.

* * * * *